PATTERN RECOGNITION AND PREDICTION SYSTEM

Filed April 26, 1963 4 Sheets-Sheet 1

INVENTOR
RAYMOND E. BONNER
BY John J. Goodwin
ATTORNEY

Aug. 16, 1966 R. E. BONNER 3,267,439

PATTERN RECOGNITION AND PREDICTION SYSTEM

Filed April 26, 1963 4 Sheets-Sheet 3

United States Patent Office 3,267,439

Patented August 16, 1966

3,267,439

PATTERN RECOGNITION AND PREDICTION SYSTEM

Raymond E. Bonner, Yorktown Heights, N.Y., assignor to International Business Machines Corporation, New York, N.Y., a corporation of New York Filed Apr. 26, 1963, Ser. No. 275,849
15 Claims. (Cl. 340—172.5)

The present invention relates to recognition systems and more particularly to an adaptive recognition system which is first adapted to recognize a given sequential pattern and is then capable of predicting a portion of the given sequential pattern upon reception of other portions thereof. The system is also capable of producing an output pattern upon the reception of an associated separate pattern input.

A sequential pattern recognition system is described in copending application Serial No. 261,750, now Patent No. 3,209,328. The sequential pattern recognition system described therein operates in two modes; the learning mode and the testing mode. In the learning mode a code pattern composed of a group of subpatterns occurring sequentially in time is applied as an input to the system. An adaptive means is conditioned in response to the input pattern to effectively provide a "positive" filter such that, when a subsequent input pattern is applied to the system during the testing mode, the system will produce an output signal, the magnitude of which is representative of the similarity between the subsequent pattern and the original pattern.

The present invention is related to the system described in copending application Serial No. 261,750, now Patent No. 3,209,328 in that a prediction system is provided which may be employed in cooperation with a sequential pattern recognition system to predict the latter half of a previously learned sequential pattern during the testing mode. The prediction system of the present invention will be particularly described in reference with a recognition system similar to that described in copending application Serial No. 261,750, now Patent No. 3,209,328 but it is to be understood that the present invention may be utilized with other species of recognition systems.

An object of the present invention is to provide a sequential pattern recognition system including a prediction circuit.

Another object of the present invention is to provide a prediction circuit for a pattern recognition system for predicting a portion of a sequential code pattern.

A further object of the present invention is to provide a prediction circuit for a pattern recognition system which is capable of predicting a portion of a previously learned sequential pattern and to evaluate the correctness of the portion thus predicted.

A further object of the present invention is to provide a prediction circuit for a pattern recognition system for producing an output pattern upon the reception of a separate, associated input pattern.

The foregoing and other objects, features and advantages of the invention will be apparent from the following more particular description of a preferred embodiment of the invention, as illustrated in the accompanying drawings.

In the drawings:

FIG. 1 is an illustrative diagram of the relationship between FIGS. 1A and 1B.

FIGS. 1A and 1B provide a schematic block diagram of a sequential pattern recognition system having a prediction system following the principles of the present invention.

Figures 1, 1A:
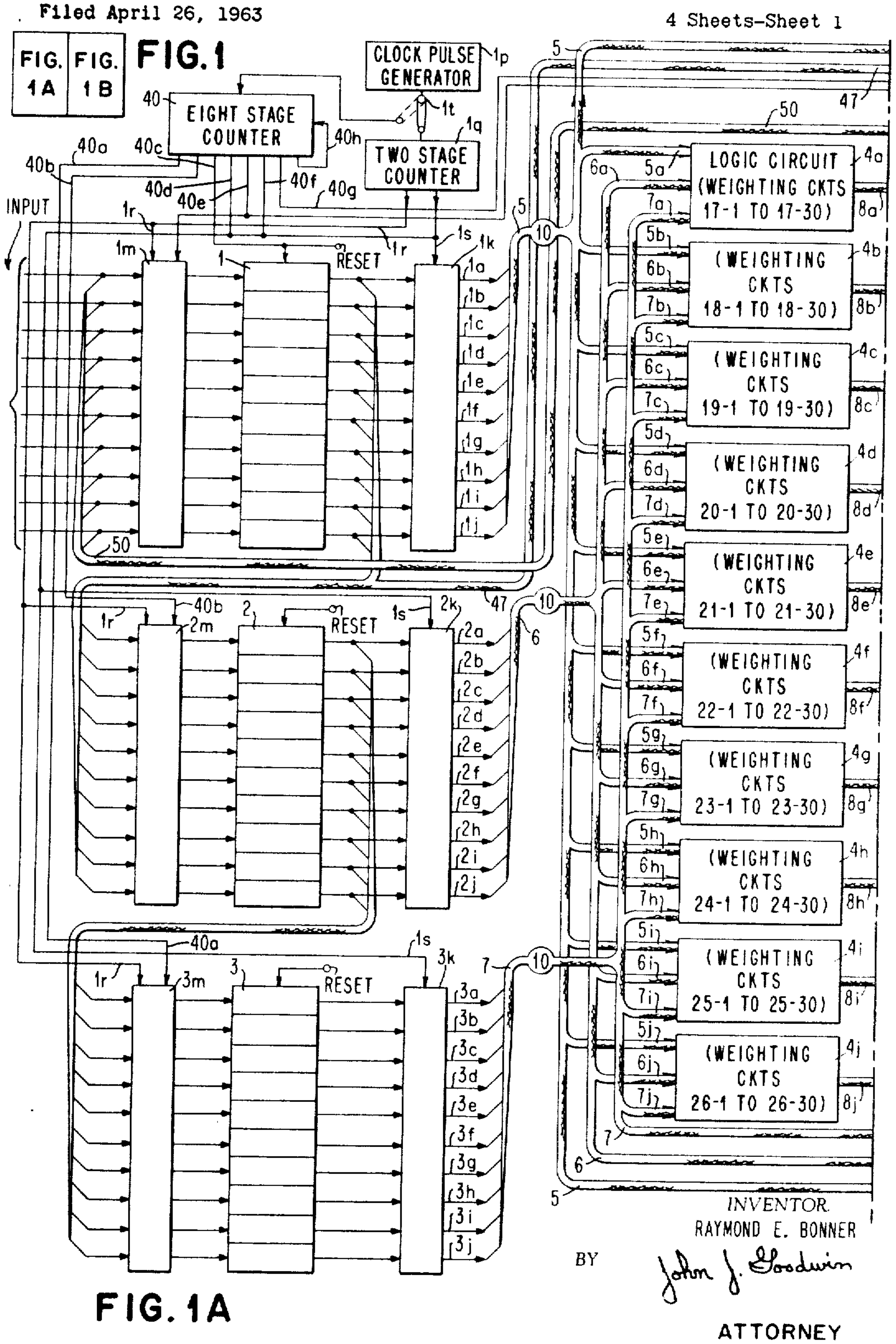

In the present embodiment, the recognition system employing the prediction feature is responsive to a pattern of input information bits. The input information may be a sequential pattern consisting of a sequence of subpatterns represented as a set of $n$ binary variables. A sequential pattern is herein defined as a total pattern composed of a number of binary subpatterns having sequential order. Any event which happens over a period of time can generate a sequential pattern by the time sampling of a set of continuous measurements of properties happening during the event. For example, an event might be a heartbeat. A set of properties associated with the event might be electrical potential measured at various points on the body. The quantized amplitudes of this set of measurements at a given instant would be a subpattern of the sequential pattern composed of the results at various instants of time.

It is to be understood that the pattern of binary input information may also be representative of physical phenomena such as spoken words and printed characters, or may be binary variables arranged in a programmed code. The invention may be employed in a variety of applications, and the example to be described has been selected for ease of explanation and is not to be considered as restricting the various practical uses of the invention.

Consider an input pattern consisting of a sequence of subpatterns of $n$ binary variables where $n$ is selected as ten for this example. Each variable may represent an alphabet character, each subpattern may represent a word, and each input pattern may represent a sentence. Thus, the sentence "DAD HAD CHAFE" (chosen for simplicity from the group of the first ten alphabet characters) would appear as follows.

TABLE I

| | A | B | C | D | E | F | G | H | I | J |
|---|---|---|---|---|---|---|---|---|---|---|
| Subpattern No. 1 | 1 | 0 | 0 | 1 | 0 | 0 | 0 | 0 | 0 | 0 |
| Subpattern No. 2 | 1 | 0 | 0 | 1 | 0 | 0 | 0 | 1 | 0 | 0 |
| Subpattern No. 3 | 1 | 0 | 1 | 0 | 1 | 1 | 0 | 1 | 0 | 0 |

A 1-bit in each subpattern indicates that the associated alphabet character appears at least once in the word. The alphabet characters are one example of the meaning which may be applied to the subpatterns. For another example, in the binary numbering system, the three subpatterns in Table I would represent the numbers 9, 137, and 181. The subpatterns might also represent the digital form of a given speech signal.

In the system to be described, the subpatterns are sequentially introduced as inputs during what is hereinafter referred to as the "learning" mode. During the learning mode the system establishes a stored indication of each time a 1-bit of each given subpattern was present with other 1-bits of the given subpattern and with 1-bits of the other subpatterns of the sequence at given times. As will be seen in the embodiment to be described, the stored indications are established as settings of electronic latch circuits. It should be understood throughout the following discussion that the stored indications may be effected in various equivalent ways. For example, in a mechanical system by means of latching relays, and in an optical system by means of exposed portions of a photosensitive medium. For purposes of illustration, the present invention is herein embodied and described as an electronic system.

Figure 1B:
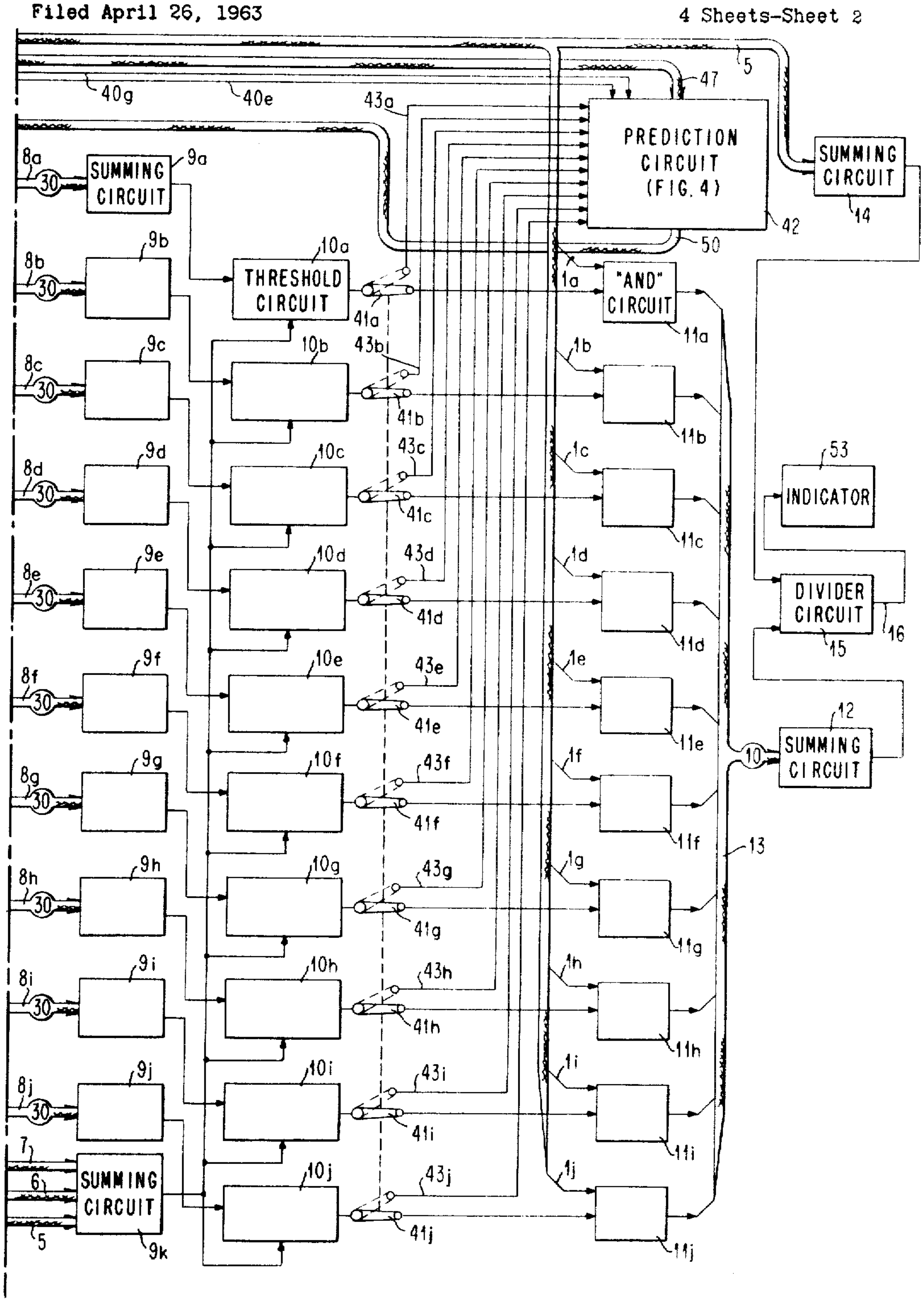

Referring to FIGS. 1A and 1B, a block diagram of an embodiment of the present invention operative with the above-described input code of Table I is illustrated. Blocks 1, 2, and 3 represent conventional storage registers. Since, in the present example, $n$ is ten, each storage register has ten bit positions, and since the input pattern contains three sub-patterns, three storage registers are employed. Storage register 1 employs an input gate 1$m$ and an output gate 1$k$. Likewise, input gate 2$m$ and output gate 2$k$ are associated with storage register 2 and input gate 3$m$ and output gate 3$k$ are associated with storage register 3. A clock pulse generator 1$p$ is provided to produce a series of pulses at given time intervals, for example, at half second intervals.

Clock pulse generator 1$p$ is connected to switch 1$t$, and may thus be alternately connected to either a two stage counter 1$q$ or an eight stage counter 40. Eight stage counter 40 is associated with the prediction mode which will be later described.

Clock pulse generator 1$p$ is ordinarily connected via switch 1$t$ to the two stage counter 1$q$ which provides gating pulses alternately on leads 1$r$ and 1$s$ at one second intervals in response to the pulses from generator 1$p$. Lead 1$r$ is connected to input gates 1$m$, 2$m$, and 3$m$ and lead 1$s$ is connected to output gates 1$k$, 2$k$, and 3$k$. The operation of the storage registers 1, 2, and 3 is conventional. Initially ($t_0$) each of the ten bit positions of each storage register 1, 2, and 3 are set to the 0-bit state. At $t_1$ a signal on lead 1$r$ gates a ten bit input signal (the first sub-pattern) on the leads designated "input," through gate 1$m$ into the ten bit positions of storage register 1. There is no signal on the leads of cable 50 and therefore only the input signals are gated into storage register 1. Also at time $t_1$ the signal on lead 1$r$, via gate 2$m$, introduces the ten 0-bits of register 1 into register 2 and the ten 0-bits of register 2 into register 3 via gate 3$m$. At time $t_2$ the pulse on lead 1$s$ gates the contents of registers 1, 2, and 3 to output leads 1$a$ through 1$j$, 2$a$ through 2$j$, and 3$a$ through 3$j$ via gates 1$k$, 2$k$, and 3$k$. At time $t_3$ a pulse on lead 1$r$ gates the next ten bit input signal (the second subpattern) from the input leads into register 1 while gating the contents of register 1 into register 2 and the contents of register 2 into register 3. At time $t_4$ a pulse on lead 1$s$ again gates the contents of registers 1, 2, and 3 to output leads 1$a$ through 1$j$, 2$a$ through 2$j$, and 3$a$ through 3$j$. Thus, one pulse from counter 1$q$ gates an input signal into register 1 and advances the stored patterns one register while the succeeding pulse from counter 1$q$ gates the contents of the three registers to the thirty output leads 1$a$ through 3$j$, each output lead respectively being associated with a separate bit storage position of registers 1, 2, and 3. It is to be noted that if serial rather than parallel bit transfer is desired, an equivalent arrangement of shift registers could be employed rather than storage registers, however this would require a series of ten shift pulses for each transfer.

A plurality of logic circuits 4$a$ through 4$j$ are provided. In the general case $n$ logic circuits are required, therefore ten logic circuits 4$a$ through 4$j$ are included in the present example. Each one of the logic circuits 4$a$ through 4$j$ is connected (via the output gates 1$k$, 2$k$, and 3$k$) to all the bit positions of each of the storage registers 1, 2, and 3. Thus, the outputs of the ten bit positions of storage register 1 are connected to logic circuits 4$a$ through 4$j$ from output gate 1$k$ via output leads 1$a$ through 1$j$ (combined into ten lead cable 5 and the ten lead branch cables 5$a$ through 5$j$). Likewise, logic circuits 4$a$ through 4$j$ are connected to the bit positions of register 2 via ten lead cable 6 and ten lead branch cables 6$a$ through 6$j$ and to the bit positions of register 3 via ten lead cable 7 and ten lead branch cables 7$a$ through 7$j$. There are therefore, a total of thirty ($n$ times the number of storage registers) input leads to each of the logic circuits 4$a$ through 4$j$. The thirty input leads to each logic circuit 4$a$ through 4$j$ are connected to separate weighting circuits within the logic circuits to be later described. There are thirty weighting circuits in each logic circuit, each having a separate output. The thirty output leads from each logic circuit 4$a$ through 4$j$, represented by cables 8$a$ through 8$j$, are coupled respectively to summing circuits 9$a$ through 9$j$.

The outputs of summing circuits 9$a$ through 9$j$ are coupled respectively to threshold circuits 10$a$ through 10$j$. The ten output leads 1$a$ through 1$j$, 2$a$ through 2$j$, and 3$a$ through 3$j$ of each of the storage register output gates 1$k$, 2$k$, and 3$k$ are coupled, via cables 5, 6, and 7, to a summing circuit 9$k$. The output of summing circuit 9$k$ is connected to each of the threshold circuits 10$a$ through 10$j$ to set the threshold level thereof.

The outputs of threshold circuits 10$a$ through 10$j$ are respectively connected to "AND" gates 11$a$ through 11$j$ through ganged switches 41$a$ through 41$j$. The switches 41$a$ through 41$j$ are ordinarily arranged to connect the outputs of threshold circuits 10$a$ through 10$j$ respectively to "AND" circuits 11$a$ through 11$j$. In the prediction mode, the switches 41$a$ through 41$j$ are changed to connect the outputs of threshold circuits 10$a$ through 10$j$ to prediction circuit 42. The other inputs to "AND" gates 11$a$ through 11$j$ are the output leads 1$a$ through 1$j$ respectively from output gate 1$k$ of register 1 via cable 5. The outputs of each of the "AND" gates 11$a$ through 11$j$ are coupled to summing circuit 12 via ten lead cable 13. The ten output leads 1$a$ through 1$j$ from output gate 1$k$ of register 1 are also connected, via cable 5, to a summing circuit 14. The sum of the outputs of "AND" gates 11$a$ through 11$j$ from summing circuit 12 and the sum of the outputs of register 1 from summing circuit 14 are applied to divider circuit 15 which provides an output on lead 16 which is the ratio of the two summations. A suitable indicator circuit 53 is coupled to lead 16 to indicate the magnitude of the ratio.

Figure 2:
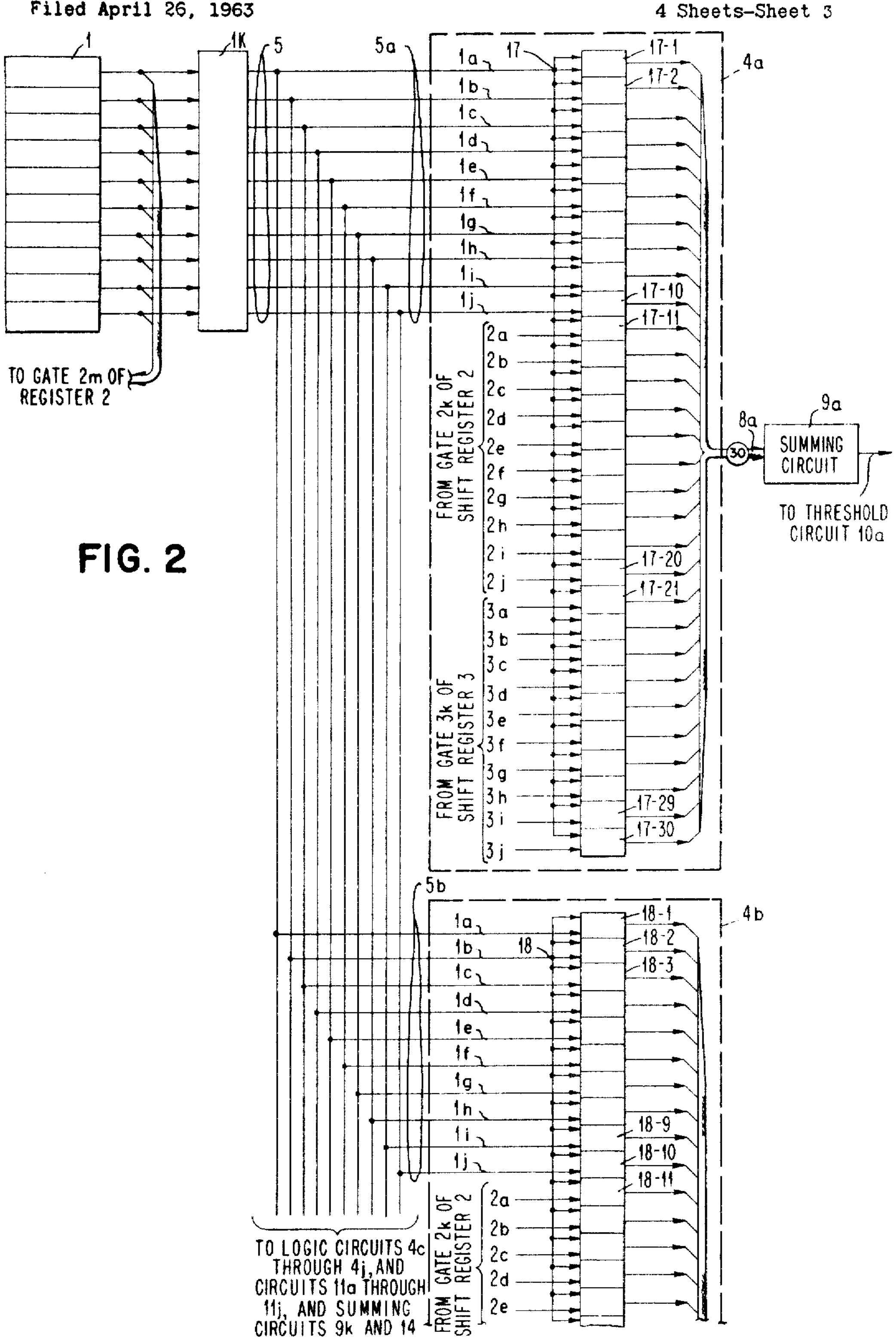
FIG. 2 is a schematic block diagram of a detail of the pattern recognition system shown in FIGS. 1A and 1B.

Referring to FIG. 2, a detailed illustration of a portion of the system of FIG. 1A is provided showing the elements included in logic circuit 4$a$ and the manner in which registers 1, 2, and 3 are connected thereto (via output gates 1$k$, 2$k$, and 3$k$). Logic circuit 4$a$ contains a plurality (thirty in the present example) of weighting circuits 17–1 through 17–30. Each logic circuit 4$a$ through 4$j$ (FIG. 1) contains weighting circuits individually connected via gates 1$k$, 2$k$, and 3$k$ to each bit position of each register 1, 2, and 3. Therefore, each logic circuit 4$a$ through 4$j$ of FIG. 1A contains thirty weighting circuits as shown in logic circuit 4$a$ of FIG. 2. The weighting circuits in each of the logic circuits 4$b$ through 4$j$ are not shown in FIG. 2, but they are arranged similar to weighting circuits 17–1 through 17–30 of logic circuit 4$a$ and will be considered to have reference numbers 18–1 through 18–30 for logic circuit 4$b$, 19–1 through 19–30 for logic circuit 4$c$, etc. up to numbers 26–1 through 26–30 for the weighting circuits of logic circuit 4$j$. The first ten weighting circuits 17–1 through 17–10 are respectively connected to the ten bit positions of register 1 via leads 1$a$ through 1$j$ and output gate 1$k$. The next ten weighting circuits 17–11 through 17–20 are respectively connected to the ten bit positions of register 2 via leads 2$a$ through 2$j$ and output gate 2$k$ and the last ten weighting circuits 17–21 through 17–30 are respectively connected to the ten bit positions of register 3 via leads 3$a$ through 3$j$ and output gate 3$k$.

The registers 1, 2, and 3 are connected via leads 1$a$ through 3$j$ to each of the thirty weighting circuits in the remaining logic circuits 4$b$ through 4$j$ in a manner identical to that illustrated for logic circuit 4$a$ in FIG. 2.

In addition to the separate inputs on leads 1$a$ through 3$j$, each of the weighting circuits 17–1 through 17–30 have a second input consisting of the output of the first bit position of register 1 on lead 1$a$ obtained at junction 17. The function of the weighting circuits 17–1 through 17–30 is to compare the output of each of the bit positions of registers 1, 2, and 3 with the first bit position of register 1. Each of the weighting circuits 18–1 through 18–30 of logic circuit 4$b$ have, in addition to the inputs on leads 1$a$ through 3$j$, a second input consisting of the output from the second bit position of register 1 on lead 1$b$ obtained at junction 18. Thus the outputs of each of the bit positions of registers 1, 2, and 3 are compared with the output of the second bit position of register 1. In like manner the outputs of each bit position of registers 1, 2, and 3 on leads 1$a$ through 3$j$ are compared with the output of the third bit position from register 1 on lead 1$c$ in weighting circuits 19–1 through 19–30 of logic circuit 4$c$; with the output of the fourth bit position of register 1 on lead 1$d$ in logic circuit 4$d$ and so on until the output of the last (tenth) bit position of register 1 on lead 1$j$ is compared with the outputs on leads 1$a$ through 3$j$ in weighting circuits 26–1 through 26–30 of logic circuit 4$j$.

Weighting circuits 17–1 through 17–30 (and the weighting circuits in the other logic circuits 4$b$ through 4$j$) each include circuitry (to be later described) such that when a 1-bit is present in the first bit position of register 1 providing a 1-bit signal on lead 1$a$, each of the weighting circuits 17–1 through 17–30 will be set in a given condition if a 1-bit signal is also present on any of the leads 1$b$ through 3$j$ from the associated bit positions of the registers 1, 2, and 3. Likewise, for logic circuit 4$b$, when a 1-bit is present in the second bit position of register 1 and provides a 1-bit signal on lead 1$b$, those ones of weighting circuits 18–1 through 18–30 associated with leads 1$a$ through 3$j$ which also have 1-bit signals present thereon will be set in a given condition. Conversely, if the first bit position of register 1 contained a 0-bit, none of the weighting circuits 17–1 through 17–30 of logic circuit 4$a$ could be set in the given condition and if the second bit position of register 1 contained a 0-bit, none of the weighting circuits 18–1 through 18–30 of logic circuit 4$b$ could be set in the given condition.

It is seen therefore, that the possible 1-bit signals from the thirty bit positions of registers 1, 2, and 3 are associated with the possible 1-bit signals from the ten bit positions of register 1 by means of the weighting circuits in the ten logic circuits 4$a$ through 4$j$ respectively.

Figures 3, 4:
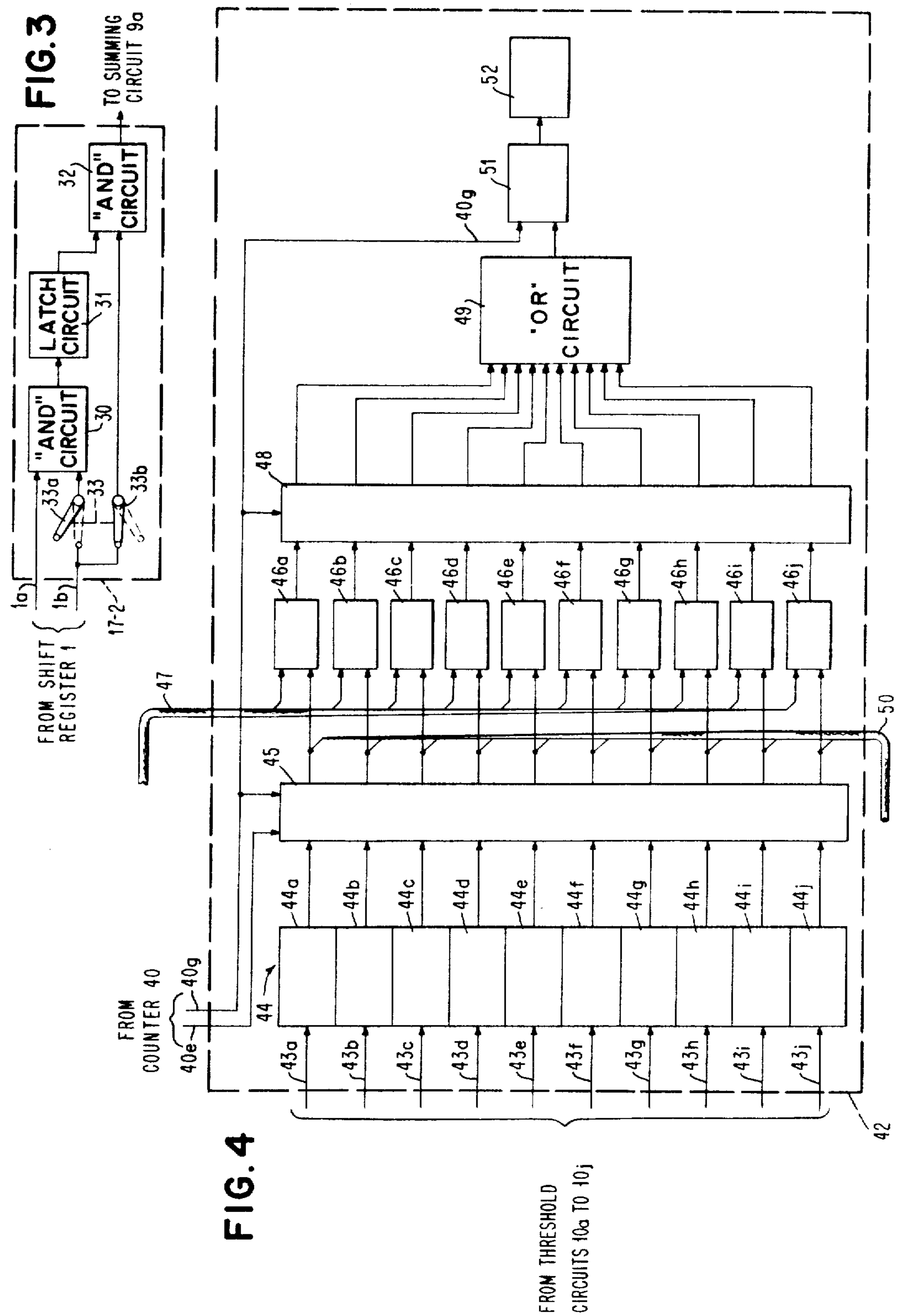
FIG. 3 is a schematic block diagram of a detail of the circuit of FIG. 2.
FIG. 4 is a schematic block diagram of the prediction system illustrated in FIGS. 1A and 1B.

Referring to FIG. 3, an illustration of the elements included in each of the weighting circuits 17–1 through 17–30, 18–1 through 18–30, etc. are shown. The weighting circuit includes a first "AND" circuit 30, a latch circuit 31 and a second "AND" circuit 32. All the weighting circuits in the logic circuits 4$a$ through 4$j$ are identical to that shown in FIG. 3, but for purposes of explanation the circuit of FIG. 3 will represent weighting circuit 17–2 (of FIG. 2) so that the input leads may be designated 1$a$ and 1$b$. Lead 1$a$ is connected directly to "learning" "AND" circuit 30 and lead 1$b$ is connected through ganged switch 33 to learning "AND" circuit 30 when contact 33$a$ is closed and contact 33$b$ is open and to "testing" "AND" circuit 32 when contact 33$a$ is open and contact 33$b$ is closed. When either contacts 33$a$ or 33$b$ are open, the effect is as if a 0-bit signal is present at the input of "AND" circuits 30 or 32 respectively. The output of "AND" circuit 30 is connected to latch circuit 31 (e.g., flip-flop) and the output of latch circuit 31 is connected as the second input to "AND" circuit 32. The output of "AND" circuit 32 represents the output of the weighting circuit and is connected to a summing circuit along with the outputs of the other weighting circuits as shown in FIG. 2.

In the learning mode switch 33 is positioned such that contact 33$a$ is closed (on all weighting circuits) and contact 33$b$ is opened. The presence of a 1-bit on both input leads (1$a$ and 1$b$) will gate "AND" circuit 30 and provide an output signal which triggers latch circuit 31 into a 1-bit output state. This is the "given condition" previously mentioned. A 0-bit on either input lead 1$a$ or 1$b$ will not gate "AND" circuit 30 and latch circuit 31 will remain in the 0-bit output state. The 1-bit output condition during the learning mode indicates that, at a given time, a 1-bit was present on lead 1$b$ (and in the second bit position of register 1) when a 1-bit was present on lead 1$a$ (and in the first bit position of register 1).

Referring again to FIG. 2, the condition of the latch circuit in each weighting circuit indicates whether a 1-bit was present in the associated bit position of the associated register at the same time as a 1-bit was present in a given one of the bit positions of register 1. For example, a 1-bit condition of the latch circuit in weighting circuit 17–1 indicates that a 1-bit was present in the first bit position of register 1. A 1-bit condition of the latch circuit in weighting circuit 17–2 indicates that a 1-bit was present in the second bit position of register 1 at the same time that a 1-bit was present in the second bit position of register 1. A 1-bit condition of the latch circuit in weighting circuit 17–20 indicates that a 1-bit was present in the last bit position of register 2 at the same time that a 1-bit was present in the first bit position of register 1. A 1-bit condition of the latch circuit in weighting circuit 18–4 indicates that a one bit was present in the fourth bit position of register 1 at the same time that a 1-bit was present in the second bit position of register 1.

In the present example there are ten logic circuits 4$a$ through 4$j$ (FIG. 1A) each containing thirty weighting circuits for a total of three hundred weighting circuits (and therefore three hundred latching circuits). The three hundred latching circuits indicate which of the thirty bit positions of the registers 1, 2, and 3 contain a 1-bit at the same time that any one of the ten bit positions of register 1 also contain 1-bits. More specifically, the thirty weighting circuits of logic circuit 4$a$ indicate which of the thirty register bit positions contain a 1-bit when the first bit position of register 1 contains a 1-bit. The thirty weighting circuits of logic circuit 4$b$ indicate which of the thirty register bit positions contan a 1-bit when the second bit position of register 1 contains a 1-bit. The thirty weighting circuits of logic circuit 4$c$ indicate which of the thirty register bit positions contain a 1-bit when the third bit position of register 1 contains 1-bit, and so on to the thirty weighting circuits in logic circuit 4$j$ which indicate which of the thirty register bit positions contain a 1-bit when the last bit position of register 1 contains a 1-bit.

Referring to FIG. 3, in the testing mode (to be later described) switch 33 of all the weighting circuits are positioned such that contact 33$a$ is open and contact 33$b$ is closed. In FIG. 3 presume latch circuit 31 has been set to the 1-bit output condition during the learning mode and is providing one of the gating signals to "testing" "AND" circuit 32. A 1-bit on lead 1$b$ during the testing mode will gate "AND" circuit 32 and provide an output signal to the associated summing circuit (such as summing circuit 9$a$).

Referring to FIG. 4, the details of the prediction circuit 42 of FIG. 1B is shown. The input leads 43$a$ through 43$j$ are connected to switches 41$a$ through 41$j$ (FIG. 1B) thereby connecting prediction storage register 44 to the outputs of the threshold circuits 10$a$ through 10$j$ when switches 41$a$ through 41$j$ are thrown. Thus, in FIG. 4, in the prediction mode the output of threshold circuit 10$a$ is entered into the first bit position 44$a$ of register 44, the output of threshold circuit 10$b$ is entered into the second bit position 44$b$ of register 44, and so on to the output of threshold circuit 10$j$ which is connected to bit position 44$j$ of register 44. The bit positions 44$a$ through 44$j$ are connected through an output gate 45. The outputs of gate 45 are respectively coupled to "EXCLUSIVE OR" circuits 46$a$ through 46$j$ and also fed back as inputs to the ten bit positions of storage register 1 via ten lead cable 50 and input gate 1$m$ (FIG. 1A). The other input leads of "EXCLUSIVE OR" circuits 46*a* through 46*j* are respectively connected to the outputs of the ten bit positions of register 1 (FIG. 1A) via ten lead cable 47. The outputs of each of the "EXCLUSIVE OR" circuits 46*a* through 46*j* are connected through an output gate 48 to an "OR" circuit 49. The output of "OR" circuit 49 is connected to an "EXCLUSIVE OR" circuit 51, which is also connected to the eight stage counter 40 (FIG. 1) via lead 40*g*. The output of "EXCLUSIVE OR" circuit 51 is then connected to a suitable indicator circuit 52.

A description of the elements of the system and their various interconnections having been set forth, a discussion of the operation of the system in the learning mode, the testing mode, and the prediction mode now follows.

Consider that the bit positions of each of the registers 1, 2, and 3 (FIG. 1A) are initially ($t_0$) set to the 0-bit condition. For explanation, the subpatterns set forth in Table I will be introduced into the system. The system is arranged for the learning mode, that is, the contacts 33*a* of switches 33 (FIG. 3) of each of the weighting circuits are closed (and contacts 33*b* are open) and the latch circuits 31 are in the 0-bit output state. Switch 1*t* is arranged to connect clock pulse generator 1*p* to two stage counter 1*q* which will provide a pulse on lead 1*r* at time $t_1$. The first subpattern "DAD" is entered (via gate 1*m*) in register 1 (FIG. 1A) at time $t_1$. Thus, the first and fourth bit positions of register 1 will be in the 1-bit state while the remaining bit positions of register 1 and all the bit positions of registers 2 and 3 will be in the 0-bit state. At time $t_2$ two stage counter 1*q* provides a pulse on lead 1*s* and the 1-bit signals will be gated onto leads 1*a* and 1*d* and applied to weighting circuits 17–1 and 17–4 of logic circuit 4*a* and to corresponding first and fourth weighting circuits in each of the other nine logic circuits 4*b* through 4*j*. In logic circuit 4*a* the latch circuit 31 in weighting circuit 17–1 will produce a 1-bit output signal since input lead 1*a* is "ANDed" with itself. The latch circuit in weighting circuit 17–4 will also be set to the 1-bit output state since the input lead 1*a* is "ANDed" with input lead 1*d*. In logic circuit 4*d* the latch circuits in the first and fourth weighting circuits 20–1 and 20–4 will produce 1-bit outputs since input lead 1*a* will be "ANDed" with input lead 1*d* at weighting circuit 20–1 and input lead 1*d* will be "ANDed" with itself at weighting circuit 20–4. The remaining two hundred and ninety-six latch circuits in each of the weighting circuits will continue to produce 0-bit output signals since in no other weighting circuits are the 1-bit leads 1*a* and 1*d* connected to a common "AND" gate.

The 1-bit output states of the latch circuits in weighting circuits 17–1, 17–4, 20–1, and 20–4 indicate that an A was present in register 1 at the same time that a D was present in register 1 and that no other letters were present in registers 1, 2, and 3.

At time $t_3$ the second sub-pattern "HAD" is entered into shift register 1 and the first sub-pattern "DAD" is entered into register 2 via gate 2*m*. With "DAD" in register 2 and "HAD" in shift register 1 there will be 1-bits in the first and fourth bit positions of register 2 and in the first, fourth, and eighth bit positions of register 1 (see Table I). Thus at time $t_4$ there will be 1-bit signals gated onto leads 1*a*, 1*d*, 1*h*, 2*a*, and 2*d*. The signal on lead 1*a* will be "ANDed" with the signals on leads 1*a*, 1*d*, 1*h*, 2*a*, and 2*d* at weighting circuits 17–1, 17–4, 17–8, 17–11, and 17–14 of logic circuit 4*a*. The latch circuits in weighting circuits 17–1 and 17–4 are already in the 1-bit output state and will remain so, and the latch circuits in weighting circuits 17–8, 17–11, and 17–14 will be switched to the 1-bit output state. Likewise, the signal on lead 1*d* will be "ANDed" with the signals on leads 1*a*, 1*d*, 1*h*, 2*a*, and 2*d* in logic circuit 4*d* resulting in 1-bit output states in the latch circuits of weighting circuits 20–1, 20–4, 20–8, 20–11, and 20–14. In logic circuit 4*h* the signal on lead 1*h* is "ANDed" with the signals on leads

1*a*, 1*d*, 1*h*, 2*a*, and 2*d* which sets the latch circuits in weighting circuits 24–1, 24–4, 24–8, 24–11, and 24–14. Thus there are now a total of fifteen latch circuits set to the 1-bit output state. The 1-bit output states of the fifteen latch circuits indicate that an A was present in register 1 at the same time that a D and H were present in register 1 with an A and D present in register 2; that a D was present in register 1 at the same time that an A and H were present in register 1 with an A and D present in register 2; and that an H was present in register 1 at the same time that an A and D were present in register 1 with an A and D present in register 2.

At time $t_5$ the third subpattern "CHAFE" is entered into register 1, the "HAD" subpattern is entered into register 2, and the "DAD" subpattern is entered into register 3. With registers 1, 2, and 3 thus arranged, at time $t_6$ there will be 1-bit signals gated onto leads 1*a*, 1*c*, 1*e*, 1*f*, 1*h*, 2*a*, 2*d*, 2*h*, 3*a*, and 3*d*. The signals on leads 1*a*, 1*c*, 1*e*, 1*f*, and 1*h* are each separately "ANDed" with the signals on all the leads 1*a*, 1*c*, 1*e*, 1*f*, 1*h*, 2*a*, 2*d*, 2*h*, 3*a*, and 3*d* in logic circuits 4*a*, 4*c*, 4*e*, 4*f*, and 4*h* resulting in 1-bit output states in the latch circuits of the weighting circuits set forth as follows.

TABLE II

| | Logic circuit 4*a* | Logic circuit 4*c* | Logic circuit 4*e* | Logic circuit 4*f* | Logic circuit 4*h* |
|---|---|---|---|---|---|
| Weighting circuit | 17-1 | 19-1 | 21-1 | 22-1 | 24-1 |
| | 17-3 | 19-3 | 21-3 | 22-3 | 24-3 |
| | 17-5 | 19-5 | 21-5 | 22-5 | 24-5 |
| | 17-6 | 19-6 | 21-6 | 22-6 | 24-6 |
| | 17-8 | 19-8 | 21-8 | 22-8 | 24-8 |
| | 17-11 | 19-11 | 21-11 | 22-11 | 24-11 |
| | 17-14 | 19-14 | 21-14 | 22-14 | 24-14 |
| | 17-18 | 19-18 | 21-18 | 22-18 | 24-18 |
| | 17-21 | 19-21 | 21-21 | 22-21 | 24-21 |
| | 17-24 | 19-24 | 21-24 | 22-24 | 24-24 |

Certain ones of the latch circuits in the weighting circuits set forth in Table II had been previously set to the 1-bit output state at time $t_2$ and $t_4$ and the "ANDing" at such circuits at time $t_6$ has no effect and they remain in the 1-bit output condition. In addition, the latch circuits in weighting circuits 17–4, 20–1, 20–4, 20–8, 20–11, 20–14, and 24–4 had been set in the 1-bit output state at times $t_2$ and $t_4$ so that the total number of fifty-six latch circuits have been set to the 1-bit output state as set forth in Table III.

TABLE III

| | Logic circuit 4*a* | Logic circuit 4*c* | Logic circuit 4*d* | Logic circuit 4*e* | Logic circuit 4*f* | Logic circuit 4*h* |
|---|---|---|---|---|---|---|
| Weighting circuit | 17-1 | 19-1 | 20-1 | 21-1 | 22-1 | 24-1 |
| | 17-3 | 19-3 | -------- | 21-3 | 22-3 | 24-3 |
| | 17-4 | -------- | 20-4 | -------- | -------- | 24-4 |
| | 17-5 | 19-5 | -------- | 21-5 | 22-5 | 24-5 |
| | 17-6 | 19-6 | -------- | 21-6 | 22-6 | 24-6 |
| | 17-8 | 19-8 | 20-8 | 21-8 | 22-8 | 24-8 |
| | 17-11 | 19-11 | 20-11 | 21-11 | 22-11 | 24-11 |
| | 17-14 | 19-14 | 20-14 | 21-14 | 22-14 | 24-14 |
| | 17-18 | 19-18 | -------- | 21-18 | 22-18 | 24-18 |
| | 17-21 | 19-21 | -------- | 21-21 | 22-21 | 24-21 |
| | 17-24 | 19-24 | -------- | 21-24 | 22-24 | 24-24 |

The fifty-six latch circuits set to their 1-bit output states provide a total accumulated indication relating to which of the thirty bit positions of storage registers 1, 2 and 3 contained 1-bits concurrently with 1-bits stored in any of the ten bit positions of register 1 at three points in time. First, when the first subpattern was entered in register 1; second, when the first subpattern was entered in register 2 and the second subpattern was entered in register 1; and third, when the first, second, and third subpatterns were entered in registers 3, 2, and 1, respectively.

In effect, the system, by means of the latch circuits set to the 1-bit state, has stored the bit relationships of the input pattern and more particularly, has provided a single pattern of latch circuits which stored the bit relationship of the three subpatterns which were sequential in time.

In the aforementioned copending application (I.B.M. Docket 15,181) it was described how the pattern recognition system, having had the pattern "DAD" "HAD" "CHAFE" introduced during the learning mode, would then respond to a subsequent input pattern during the testing mode. If the input pattern during the testing mode were also "DAD" "HAD" "CHAFE" a maximum output signal would be produced by the system, but if the subsequent input pattern was quite different, a zero output signal would be produced. For subsequent input patterns which were similar to "DAD" "HAD" "CHAFE" an output signal between zero and maximum would be produced depending on the degree of similarity. Thus the pattern recognition system in the said aforementioned application is designed to learn a given pattern and thereafter be employed to distinguish subsequent patterns which are dissimilar to the learned pattern.

In the present invention the embodiment is designed to learn a given pattern and subsequently respond to the first part of the same pattern and to predict and provide the latter portion of the pattern. The embodiment is described with relation to the alphabetic pattern example for the purpose of illustration, however it is evident that the prediction feature is useful in a wide variety of situations. One use of the invention would be in the information retrieval art wherein the present embodiment may be employed as an adaptive retrieval device. The device may adaptively learn an entire pattern and then be used to supply the entire pattern at a later time even though only a portion of the pattern is then available.

Another use would be in the medical field wherein a sequence of binary information relating to the separate symptoms of a disease may be introduced to the device during the learning mode, and upon later introduction of a given number of symptoms the device would provide the other symptoms to be considered in determining the disease.

In the present example the system has learned the sequential binary pattern associated with "DAD" "HAD" "CHAFE." Presume that during the testing mode only the "DAD" "HAD" portion of the learned pattern is available. The "DAD" "HAD" pattern is introduced into the system sequentially as inputs to storage register 1 (FIG. 1) on the leads designated "input." The system operation for the period when the pattern "DAD" "HAD" is entered is referred to as the testing mode. As each of the subpatterns "DAD" and "HAD" are applied to the system an output signal will be produced on output lead 16 and applied to indicator 53 (FIG. 1B) to determine whether the first portion of the pattern is similar to the first portion of the learned pattern. The obtaining of such indication in indicator 53 is not strictly necessary if it is known in advance that the first portion of the pattern of the testing mode is the same as the learned pattern and it is only desired that the system predict the latter portion. The providing of the signal indication in indicator 53 adds an additional feature, that is, if the output signals on lead 16 are of low magnitude, it indicates that the first portion of the testing pattern is not related to the learned pattern and prediction of the latter portion is not to be considered.

At the beginning of the testing mode the bit positions of storage registers 1, 2, and 3 (FIG. 1A) are switched to the 0-bit state by a pulse on the designated reset leads (FIG. 1A) and the switches 33 (FIG. 3) in all the weighting circuits 17–1 through 26–30 are positioned such that contact 33*a* is open and contact 33*b* is closed, thus connecting leads 1*a* through 3*j* to the associated ones of "AND" circuits 32 in the weighting circuits in each of the logic circuits 4*a* through 4*j*. Clock pulse generator 1*p* remains connected to two stage counter 1*q* and switches 41*a* through 41*j* are arranged to connect threshold circuits 10*a* through 10*j* to "AND" circuits 11*a* through 11*j*. The pulses from two stage counter 1*q* are used during the testing mode, the first pulse during the testing mode being described as occurring at time $t_1$. At time $t_1$ the first subpattern "DAD" is entered into storage register 1 through the leads designated "input" by a gating pulse on lead 1*r* and at time $t_2$ it is gated onto leads 1*a* through 1*j* along with the 0-bit signals from registers 2 and 3 on leads 2*a* through 3*j* by a gating pulse on lead 1*s*. Leads 1*a* through 3*j* are connected to the weighting circuits in each of the logic circuits 4*a* through 4*j*. Referring to FIG. 3, it is seen that the lead 1*b* is connected directly to testing "AND" circuit 32 and is decoupled from "AND" circuit 30 effectively establishing a 0-bit condition at the input of "AND" circuit 30. Therefore, presence of a 1-bit or a 0-bit on lead 1*a* will be immaterial since "AND" circuit 30 cannot be gated. If the latch circuit 31 in a particular weighting circuit was not set to the 1-bit output state during the learning mode, the presence of a 1-bit on the associated input lead to the "AND" circuit 32 will also be immaterial since the signal to "AND" circuit 32 from such latch circuit 31 will be a 0-bit. For example, after the three subpatterns had been entered in the system during the learning mode, latch circuit 31 of the particular weighting circuit 17–2 (FIG. 3) remained in the 0-bit state. Thus a 1-bit on lead 1*b* during the testing mode would not gate "AND" circuit 32.

Referring to the present testing mode example, the first subpattern "DAD" in register 1 is transmitted to the weighting circuits on leads 1*a* through 1*j* with the 0-bits from registers 2 and 3 on leads 2*a* through 3*j*. Thus, there will be 1-bits only on leads 1*a* and 1*d*. The 1-bits on leads 1*a* and 1*d* are applied to the first and fourth weighting circuits in each of the logic circuits 4*a* through 4*j*. It was explained that the latch circuits in the weighting circuits set forth in Table III have been set to the 1-bit output state. Therefore, the 1-bit signals on leads 1*a* and 1*d* will produce an output signal from "AND" circuits 32 in weighting circuits 17–1, 17–4, 19–1, 20–1, 20–4, 21–1, 22–1, 24–1, and 24–4. In FIG. 1, the outputs from "AND" circuits 32 in weighting circuits 17–1 and 17–4 are added in summing circuit 9*a*, the outputs from "AND" circuit 19–1 is applied to summing circuit 9*c*, the outputs from weighting circuits 20–1 and 20–4 are added in summing circuit 9*d*, the output of weighting circuits 21–1 and 22–1 are applied to summing circuits 9*e* and 9*f*, respectively, and the outputs of weighting circuits 24–1 and 24–4 are added at summing circuit 9*h*.

The signals on leads 1*a* through 3*j* from registers 1, 2, and 3 are connected, via cables 5, 6, and 7 to summing circuit 9*k*. Since only leads 1*a* and 1*d* contain 1-bit signals, the output signal from summing circuit 9*k* will represent a sum of two. The output signal from summing circuit 9*k* is applied to each of the threshold circuits 10*a* through 10*j* and sets the threshold levels thereof equal to the two bit level. The output signals from summing circuits 9*a* through 9*j* are also applied to threshold circuits 10*a* through 10*j*. Since only summing circuits 9*a*, 9*d*, and 9*h* of the summing circuits 9*a* through 9*j* have levels of two bits, there will be output signals only from threshold circuits 10*a*, 10*d*, and 10*h* which are applied, via switches 41*a*, 41*d*, and 41*h*, to "AND" circuits 11*a*, 11*d*, and 11*h*. Note, the threshold circuits 10*a* through 10*j* each produce a 1-bit output signal for input signals equal to or above the threshold level and 0-bit output signals for input signals below the threshold level.

The ten output leads 1*a* through 1*j* associated with the ten bit positions of register 1 are also connected, via cable 5, to "AND" circuits 11*a* through 11*j* with lead 1*a* being connected to "AND" circuit 11*a*, lead 1*b* being connected to "AND" circuit 11*b*, and so on. The "ANDing" of the outputs of threshold circuits 10*a* through 10*j* with the signals on leads 1*a* through 1*j* insures that a 1-bit is present in register 1 when a recognition is indicated. Thus, although there are output signals from threshold circuits 10*a*, 10*d*, and 10*h*, only leads 1*a* and 1*d* have 1-bit signals thereon and "AND" circuit 11*h* will not be gated.

The outputs from threshold circuits 10*a* and 10*d* are "ANDed" with the 1-bits on leads 1*a* and 1*d* at "AND" circuits 11*a* and 11*d*. It is significant to note that the outputs of "AND" circuits 11*a* and 11*d* are indicative that an "A" was present with a "D" in the first subpattern of both the learning input pattern and the testing input pattern. The 1-bit output signal of circuits 11*a* and 11*d* are added at summing circuit 12 via cable 13. The amplitude of the output signal from summing circuit 12 is therefore at a two bit level. The signals on leads 1*a* through 1*j* are also added at summing circuit 14. In the present instance there will be 1-bit signals on leads 1*a* and 1*d* producing a two bit level output signal from summing circuit 14. The output signal from summing circuit 12 is applied to dividing circuit 15 where it is divided by the output signal from summing circuit 14. The value of the output signal from dividing circuit 15 on lead 16 is termed the "match" number. In the present instance the output signal from dividing circuit 15 is the ratio of the two bit level signal from summing circuit 12 and the two bit level signal from summing circuit 14, which results in a ratio of "one." The amplitude of the output signal on lead 16 would therefore represent a ratio of one, which is the maximum value of the match number. This was to be expected since the first subpattern "DAD" of the input testing pattern was identical to the first subpattern employed to condition the system during the learning mode. The output signal on lead 16 is then applied to indicator 53 to provide a visual indication of the magnitude of the signal. Indicator 53 may, for example, be a voltmeter calibrated for signals between zero and the maximum signal representative of a match number of one.

When the second subpattern "HAD" is entered into register 1 and the first subpattern "DAD" is shifted to register 2, the operation of the system of FIG. 1 is similar to the preceding description. There would be 1-bit signals on leads 1*a*, 1*d*, 1*h* 2*a*, and 2*d*. The 1-bit signal on lead 1*a* would be gated by the 1-bit signal from "AND" circuits 32 of weighing circuits 17–1, 19–1, 20–1, 21–1, 22–1, and 24–1. The signal on lead 1*d* would be gated in weighting circuits 17–4, 20–4, and 24–4. The signal on lead 1*h* would be gated by weighting circuits 17–8, 19–8, 20–8, 21–8, 22–8, and 24–8. The signal on lead 2*a* would be gated by weighting circuits 17–11, 19–11, 20–11, 21–11, 22–11, and 24–11, and the signal on lead 2*d* would be gated by weighting circuits 17–14, 19–14, 20–14, 21–14, 22–14, and 24–14 (in accordance with Table III). This results in a five bit level output signal from summing circuits 9*a*, 9*d*, and 9*h*, and a four bit level output signal from summing circuits 9*c*, 9*e*, and 9*f*. The 1-bit signals on leads 1*a*, 1*d*, 1*h*, 2*a*, and 2*d* are added at summing circuit 9*k* to produce a five bit level output signal which is employed to set the threshold level of threshold circuits 10*a* through 10*j* at a five bit level. Thus, only the five bit level output signals from summing circuits 9*a*, 9*d*, and 9*h* will cause a 1-bit signal from threshold circuits 10*a* and 10*d* to be applied to the "AND" circuits 11*a*, 11*d*, and 11*h*. The 1-bit signals from threshold circuits 10*a*, 10*d*, and 10*h* are gated through "AND" circuits 11*a*, 11*d*, and 11*h* by the 1-bit signals on leads 1*a*, 1*d*, and 1*h*, and are added at summing circuit 12 to provide a three bit level signal to dividing circuit 15. The signals on leads 1*a* through 1*j* are added by summing circuit 14 to provide a three bit level (due to leads 1*a*, 1*d*, and 1*h*) to dividing circuit 15. The ratio of the two input signals to dividing circuit 15 is unity, and the output signal on lead 16 would represent a "one" match number. This signal, when applied to indicator 53 indicates that the second subpattern entered in register 1 during the testing mode is similar with the second sub-pattern employed in the learning mode.

For purposes of illustration, an example of the circuit operation when the testing pattern is not similar to the learned pattern will be described. Presume that the first subpattern of the testing pattern was "HIDE" rather than "DAD." The binary equivalent for such subpattern is set forth as follows.

TABLE IV

| A | B | C | D | E | F | G | H | I | J |
|---|---|---|---|---|---|---|---|---|---|
| 0 | 0 | 0 | 1 | 1 | 0 | 0 | 1 | 1 | 0 |

The first subpattern "HIDE" as shown in Table IV would be gated into storage register 1 at time $t_1$ and then gated to logic circuits 4*a* through 4*j* (along with the 0-bit contents of registers 2 and 3 at time $t_2$. Leads 1*d*, 1*e*, 1*h*, and 1*i* would have contained 1-bit signals. In accordance with Table III, the 1-bit signals on leads 1*d*, 1*e*, 1*h*, and 1*i* would have produced output signals from weighting circuits 17–4, 17–5, 17–8, 19–5, 19–8, 20–4, 20–8, 21–5, 21–8, 22–5, 22–8, 24–4, 24–5, and 24–8. Thus, there would have been a three bit level output signal from summing circuits 9*a* and 9*h* and two bit level output signals from summing circuits 9*c*, 9*d*, 9*e*, and 9*f*. The 1-bit signals on leads 1*d*, 1*e*, 1*h*, and 1*i* when added at summing circuit 9*k* would produce a four bit level output signal at summing circuit 9*k* which is employed to set the threshold level of threshold circuits 10*a* through 10*j* to a four bit level. None of the output signals from summing circuits 9*a*, 9*c*, 9*d*, 9*e*, 9*f*, or 9*h* would have passed the threshold circuits, and the result would have been a zero level output signal from summing circuit 12. When the zero level signal from summing circuit 12 was divided by the four bit level signal from summing circuit 14, the result would have been a zero match output signal on lead 16 producing a zero indication at indicator 53. The zero indication informs the operator of the system, if he did not previously know, that the first portion of the testing subpattern is not similar to the learned pattern and that it is futile to employ the prediction mode.

In the described example, however, the first portion of the testing pattern is "DAD" "HAD" and it is desired that the latter portion of the learned pattern be predicted.

The operator of the system employs the prediction mode by throwing switches 41*a* through 41*j* and switch 1*t*. This connects the outputs of threshold circuits 10*a* through 10*j* to prediction circuit 42 and connects clock pulse generator 1*p* to eight stage counter 40. It is to be noted that if a more automatic system is desired, it would be possible to provide an arrangement whereby indicator 53, having determined that the first portion of the testing pattern was similar to the learned pattern, would then provide a signal to operate switches 41*a* through 41*j* and switch 1*t*. For sake of simplicity, it is presumed that in the present embodiment that the switches are operated manually.

Eight stage counter 40 may be a ring counter which begins operation upon reception of a single start pulse. The counter 40 then produces a cycle of eight time spaced output pulses on eight separate output leads. The eighth output pulse is fed back to the counter to turn it off.

The pulse from clock pulse generator 1*p* via switch 1*t* commences the cycle of eight stage counter 40. The first output pulse from counter 40 appears on lead 40*a*, which is connected to gate 3*m*, thereby shifting the "DAD" subpattern in register 2 to register 3. The second pulse from counter 40 appears on lead 40*b* which is connected to gate 2*m*, thereby shifting the "HAD" subpattern in register 1 to register 2. The third pulse from counter 40 appears on lead 40*c* which is connected to the reset lead of register 1, thereby setting all the bit positions of register 1 to the zero state.

The fourth pulse from counter 40 appears on lead 40*d* which is connected to the output gates 1*k*, 2*k*, and 3*k*, thereby gating the contents of registers 1, 2, and 3 to the logic circuits 4*a* through 4*j*. With the subpatterns "DAD" in register 3 and "HAD" in register 2 and zeros in register 1, there will be 1-bit signals on leads 2a, 2d, 2h, 3a, and 3d. The latch circuits within logic circuits 4a through 4j which are in the 1-bit state are set forth in Table III. The result is five output signals from logic circuits 4a, 4c, 4e, 4f, and 4h and two output signals from logic circuit 4d which are added in summing circuits 9a, 9c, 9d, 9e, 9f, and 9h. The 1-bit signals on leads 2a, 2d, 2h, 3a, and 3d are added at summing circuit 9k and thereby provide a five bit level threshold signal to threshold circuits 10a through 10j. Thus, only the output signals from summing circuits 9a, 9c, 9e, 9f, and 9h will produce 1-bit output signals from threshold circuits 10a, 10c, 10e, 10f, and 10h. The 1-bit signals from these five threshold circuits are connected through switches 41a, 41c, 41e, 41f, and 41h and leads 43a, 43c, 43e, 43f, and 43h to bit positions 44a, 44c, 44e, 44f, and 44h of register 44 of prediction circuit 42 (FIG. 4).

The subpattern now stored in register 44 is the predicted latter portion of the learned pattern. In order to determine whether the predicted subpattern is correct, the contents of register 44 will be fed back and stored in register 1 (FIG. 1A), the predicted pattern stored in register 1 will then be transmitted through the system along with the contents of registers 2 and 3. The resultant outputs from threshold circuits are then stored in register 44. The contents of register 44 will then be compared with the contents of register 1. If the contents of the two registers are the same, the predicted subpattern was correct. The determination of the correctness of the predicted subpattern in register 44 is carried out as follows.

The fifth pulse from counter 40 (FIG. 1A) appears on lead 40e which is connected to gate 1m and to gate 45 (FIG. 4). Thus the 1-bits in bit position 44a, 44c, 44e, 44f, and 44h are fed back to the corresponding first, third, fifth, sixth, and eighth bit positions of register 1 through gates 45 and 1m via cable 50. Referring to FIG. 4, it is noted that by opening gate 45 the signals from register 44 are also applied to "EXCLUSIVE OR" circuits 46a through 46j. There will also be signals on the ten leads of cable 47 which is connected back to register 1 which may result in output signals from one or more of circuits 46a through 46j, however, since gate 48 is closed, such erroneous outputs have no present effect.

The sixth pulse from counter 40 appears on lead 40f which is connected to output gates 1k, 2k, 3k thereby gating the contents of registers 1, 2, and 3 to logic circuits 4a through 4j. Due to the feedback into register 1 during the previous pulse, there will now be 1-bit signals on leads 1a, 1c, 1e, 1f, 1h, 2a, 2d, 2h, 3a and 3d. With the latch conditions as set forth in Table III, there will be ten output signals from logic circuits 4a, 4c, 4e, 4f, and 4h, and four output signals from logic circuit 4d. The total of ten 1-bits from registers 1, 2, and 3 are added at summing circuit 9k and the ten bit level signal is applied to threshold circuits 10a through 10j. Thus, 1-bit signals will be produced only by threshold circuits 4a, 4c, 4e, 4f, and 4h. The output signals from these threshold circuits are applied as inputs to storage register 44 and are entered into the appropriate bit positions 44a, 44c, 44e, 44f, and 44h. If the prediction system has provided the correct subpattern, the subpattern presently stored in register 44 should be the same as the predicted subpattern stored in register 1 (FIG. 1A).

The contents of the ten bit positions of register 1 are respectively applied, via ten lead cable 47, to the "EXCLUSIVE OR" circuits 46a through 46j. The seventh pulse from counter 40 appears on lead 40g and is applied to gate 45, gate 48, and "EXCLUSIVE OR" circuit 51. The opening of gate 45 applies the contents of register 44 to the "EXCLUSIVE OR" circuits 46a through 46j. If the contents of register 44 are the same as the contents of register 1, each of the "EXCLUSIVE OR" circuits 46a through 46j will have either two 0-bits or two 1-bits applied thereto. Thus there will be no outputs therefrom and the output of "OR" circuit 49 will be zero. The zero output from "OR" circuit 49, when applied to "EXCLUSIVE OR" circuit 51 along with the pulse on lead 40g, producing an output signal from circuit 51 which is applied to indicator circuit 52 to indicate a correctly predicted subpattern. Indicator circuit 52, in its simplest form, may be an indicator lamp.

If the contents of register 44 were different from the contents of register 1, at least one of the "EXCLUSIVE OR" circuits 46a through 46j would have a 0-bit and a 1-bit applied thereto, resulting in an output signal from "OR" circuit 49. The output signal from "OR" circuit 49, when applied to "EXCLUSIVE OR" circuit 51 along with the pulse on lead 40g, will result in a zero output from circuit 51 and indicator circuit 52 will not be energized, thereby indicating an incorrect prediction.

The eighth and final pulse from counter 40 on lead 40h is fed back to turn off the operation of the counter.

What has been described is an adaptive recognition system for predicting and providing portions of a previously learned sequential pattern. The invention has been described with relation to a particular recognition system but it is not limited thereto. Also, it is possible to modify the operation of the described system if desired. For example, it may be determined that the threshold levels of threshold circuits 10a through 10j need not be set at a value equal to the sum of the 1-bits on leads 1a through 3j in a given instance, and instead summing circuit 9k may be adjusted to provide an output threshold setting signal which is, for example, 0.75 percent of the sum. This may provide an output from the threshold circuits even in the event of an error in a binary digit. Also, the output match number may not be required to be unity to indicate a recognition, but lesser valued match numbers may be accepted to also overcome single errors in given subpatterns which do not effect the overall correctness of the input testing pattern.

The embodiment described related to ten bit subpatterns. It would be possible to employ subpatterns of greater bit length (i.e., $n$ bits) by using registers with $n$ storage positions. There would also be $n$ logic circuits (and associated summing circuits, theshold circuits, etc.) required, and the number of weighting circuits in each logic circuit would be $n$ times the number of registers.

Also, in the foregoing discussion, three storage registers were shown and input patterns having three subpatterns were described. If sequences of greater than three subpatterns are desired, two approaches are possible. A storage register may be provided for each subpattern in the input pattern. This approach however, would require extensive structure, for example an input having ten subpatterns with ten bit positions each would require ten storage registers and one thousand weighting circuits. A more practical approach is to provide an adequate number of storage registers, for example, three, and to shift the input subpatterns sequentially therethrough. If ten subpatterns are included in the input pattern, the first three subpatterns would be compared to each other as described hereinabove. When the fourth subpattern is entered into the first storage register, the first subpattern is shifted out of the third storage register. Thus, the fourth subpattern is compared to the second and third subpatterns, but not to the first subpattern. Likewise, the fifth subpattern is compared to the third and fourth subpatterns, but not to the first and second subpatterns. Such operation is not as complete as comparing each of the subpatterns with all the others, but the system will nevertheless function with a high degree of reliability and the more complex system is not required.

Modification of the system in the prediction mode is also possible so that other than the last subpattern may be predicted. In the present embodiment the bit positions of storage registers 1, 2, and 3 were coupled, at the weighting circuits, in combination with the bit positions of storage register 1. If instead the bit positions of storage registers 1, 2, and 3 were coupled in combination with the bit positions of register 2, the second subpattern could be predicted. Thus, in the prediction mode, after "DAD" and "CHAFE" were introduced, the subpattern "HAD" could be predicted, provided that register 44 (FIG. 4) was coupled back to register 2 and the time sequence of the gating pulses were adjusted. Likewise, with the proper changes in connections, the first subpattern "DAD" could be predicted after the latter portion of the pattern was introduced. In constructing an actual system, it may be desirable to employ plug connections rather than permanent terminals so that such variations in operation may be practically possible.

The utility of the present invention as discussed thus far related to a system for predicting and providing missing portions of a previously learned sequential pattern. Another use of the system is that of a code association device. That is, the system is conditioned during the learning mode such that, during the testing mode the introduction of one code word will produce another code word output. For example, presume that it is desired to provide a system which, when the word FACE is entered, will produce the part of the anatomy associated therewith such as HEAD.

During the learning mode the binary code for FACE (1010110000) is entered (by methods previously described) in register 2 and the binary code for HEAD (1001100100) is entered in register 1. The two words are then simultaneously applied to logic circuits 4*a* through 4*j*. There will be 1-bit signals on leads 1*a*, 1*d*, 1*e*, 1*h*, 2*a*, 2*c*, 2*e*, and 2*f*. This will result in latch circuits being set to the 1-bit state in the first, fourth, fifth, eighth, eleventh, thirteenth, fifteenth, and sixteenth weighting circuits in each of the logic circuits 4*a*, 4*d*, 4*e*, and 4*h*. This arrangement is set forth as follows.

TABLE V

| | Logic circuit 4*a* | Logic circuit 4*d* | Logic circuit 4*e* | Logic circuit 4*h* |
|---|---|---|---|---|
| Weighting circuits | 17-1<br>17-4<br>17-5<br>17-8<br>17-11<br>17-13<br>17-15<br>17-16 | 20-1<br>20-4<br>20-5<br>20-8<br>20-11<br>20-13<br>20-15<br>20-16 | 21-1<br>21-4<br>21-5<br>21-8<br>21-11<br>21-13<br>21-15<br>21-16 | 24-1<br>24-4<br>24-5<br>24-8<br>24-11<br>24-13<br>24-15<br>24-16 |

The system is then switched to the prediction mode and the word FACE is entered into register 2. When the word FACE is applied to the logic circuits, there will be 1-bits on leads 2*a*, 2*c*, 2*e*, and 2*f* and the threshold circuits will be set to a four bit threshold level. There will be four output signals from each of logic circuits 4*a*, 4*d*, 4*e*, and 4*h* which will result in output signals from threshold circuits 10*a*, 10*d*, 10*e*, and 10*h*. The output signals from these threshold circuits are entered in register 44 (FIG. 4) in bit positions 44*a*, 44*d*, 44*e*, and 44*h*. Thus, the word HEAD related to the word FACE is stored in register 44 upon the input of the word FACE alone. The feedback operation of register 44 to register 1 via lead 50 is not required in this instance.

If the operation of the system for the word association operation just described is analyzed, it is seen that one word is applied to all the logic circuits and is "ANDed" thereat with the associated word during the learning mode. If desired, a separate "association" register could be provided having bit positions connected as "AND" inputs to the logic gates. In this way the contents of registers 1, 2, and 3 could be associated with the word in the separate register. The length of the separate association register may be greater than the *n* length registers 1, 2, and 3 provided an increased number of logic circuits were provided.

What has been described is an adaptive pattern recognition system for sequential patterns. The system includes a prediction feature which permits a portion of a previously learned pattern to be produced at the output upon reception of the other portion of the pattern. The system is also capable of producing an output pattern which is associated with a previously learned input pattern.

While the invention has been particularly shown and described with reference to a preferred embodiment thereof, it will be understood by those skilled in the art that various changes in form and details may be made therein without departing from the spirit and scope of the invention.

What is claimed is:

1. An adaptive pattern recognition and prediction system comprising:

an input storage means, an adaptive means coupled to said input storage means, and an output means coupled to said input storage means and said adaptive means, said input storage means being responsive to a first plurality of seriately occurring coded signals, each coded signal being composed of *n* data bits being in either a "zero" or "one" binary state, said adaptive means being responsive to said first plurality of coded signals stored in said input means for producing an analog representation of the relationship of each of the *n* data bits in said "one" binary state in each coded signal in combination with all the data bits in said one binary state of all the coded signals in said first plurality, said input means being further responsive to a second plurality of seriately occurring coded signals, said second plurality of coded signals being identical to said first plurality with the exception that at least one coded signal of said first plurality is omitted, said first plurality of coded signals being removed from said input storage means upon reception of said second plurality of coded signals, and said adaptive means being further responsive to said second plurality of coded signals stored in said input storage means for providing at least a first one coded output signal representative of said at least one omitted coded signal.

2. An adaptive pattern recognition and prediction system according to claim 1 wherein said output means includes an output storage means coupled to said adaptive means for storing said at least first one coded output signal therefrom.

3. An adaptive pattern recognition and prediction system according to claim 2 wherein said output means further includes means for transmitting said at least first one coded output signal stored in said output storage means to said input storage means.

4. An adaptive pattern recognition and prediction system according to claim 3 wherein said input storage means, upon reception of said at least first one coded output signal transmitted from said output storage means transmits to said adaptive means said at least first one coded output signal in combination with said second plurality of coded signals.

5. An adaptive pattern recognition and prediction system according to claim 4 wherein said adaptive means is further responsive to said at least first one coded output signal in combination with said second plurality of coded signals transmitted from said input storage means for producing at least a second one coded output signal representative of said at least one omitted coded signal.

6. An adaptive pattern recognition and prediction system according to claim 5 wherein said output storage means in said output means is further responsive to said second output signal from said adaptive means for storing said at least second one coded output signal representative of said at least one omitted coded signal.

7. An adaptive recognition and prediction system according to claim 6 wherein said output means further includes means responsive to said at least first one coded output signal stored in said input storage means for comparing said at least first one coded output signal with said at least second one coded output signal stored in said output storage means.

8. An adaptive recognition and prediction system according to claim 7 wherein said output means further includes a plurality of comparison circuits coupled to said input storage means,
  a first gating means having an input coupled to said output storage means and an output coupled to said input storage means and to said plurality of comparison circuits,
  a second gating means coupled to the outputs of said plurality of comparison circuits,
  and means coupled to the output of said second gating means for indicating when said at least first one coded output signal from said input storage means and said at least second one coded output signal from said output storage means are not identical.

9. An adaptive pattern recognition and prediction system comprising:
  an input storage means,
  an adaptive means coupled to said input storage means,
  and an output means coupled to said input storage means and said adaptive means,
  said input storage means being responsive to a first plurality of seriately occurring coded signals, each coded signal being composed of $n$ data bits being in either a "zero" or "one" binary state,
  said adaptive means being responsive in a first mode of operation to said first plurality of coded signals stored in said input means for producing an analog representation of the relationship of each of the $n$ data bits in said "one" binary state in each coded signal in combination with all the data bits in said "one" binary state of all the coded signals in said first plurality,
  said input means being further responsive to a second plurality of seriately occurring coded signals, said second plurality of coded signals being identical to said first plurality with the exception that at least one coded signal of said first plurality is omitted, said first plurality of coded signals being removed from said input storage means upon reception of said second plurality of coded signals,
  said adaptive means being further responsive in a second mode of operation to said second plurality of coded signals stored in said input storage means for providing at least a first one coded output signal representative of said at least one omitted coded signal,
  and wherein said output means includes an output storage means coupled to said adaptive means for storing said at least first one coded output signal therefrom.

10. An adaptive recognition and prediction system according to claim 9 wherein said input storage means includes a plurality of signal storage devices each having $n$ bit storage positions such that incoming ones of said seriately occurring coded signals are initially stored in a first one of said plurality of storage devices and are sequentially transferred to subsequent ones of said plurality of storage devices upon the reception of subsequent ones of said seriately occurring coded signals.

11. An adaptive recognition and prediction system according to claim 10 wherein said adaptive means includes a plurality of logic circuits, each logic circuit coupled to all the $n$ bit positions of each one of said plurality of storage devices in said input storage means, and each logic circuit also coupled to a separate one of the $n$ bit positions in said first one of said storage devices, each logic circuit providing analog representations of the presence of each of the $n$ data bits in said "one" binary state of said first plurality of coded signals stored in said storage devices in combination with the associated separate data bits in the "one" binary state of the coded signal stored in said first one of said storage devices,
  and wherein each logic circuit is further responsive to said second plurality of coded signals for producing at least a first one coded output signal representative of the relationship between the code bits of said second plurality of coded signals in said "one" binary state and said analog representations, said at least a first one coded output signal also being representative of said at least one omitted coded signal.

12. An adaptive recognition and prediction system according to claim 11 wherein each logic circuit includes a plurality of latch circuits, a first one of said latch circuits having first and second input leads coupled to a single one of said bit positions of said first one of said storage devices of said input storage means and the others of said plurality of latch circuits having a first input lead coupled to the same said single one of said bit positions as said first latch circuit and a second input lead coupled to another one of said bit positions of said plurality of storage devices of said input storage means, each of said latch circuits changing state to provide an analog representation when the signals from said storage devices on said first and second input leads are in said "one" binary state when said input storage means has stored therein said first plurality of coded signals.

13. An adaptive recognition and prediction system according to claim 9 wherein said input storage means includes,
  $k$ amount of storage registers each having $n$ storage elements for storing $k$ groups of coded signals, each group having $n$ data bits having a "zero" or "one" binary value,
  and said adaptive means coupled to said input storage means includes $n$ logic circuits each including $kn$ latch circuits for a total of $kn^2$ latch circuits, each latch circuit having first and second input leads and one output lead,
  each separate one of the $n$ storage elements of each of the $k$ storage registers being respectively connected to said second input lead of a separate one of said $kn$ latch circuits in each of said $n$ logic circuits and each separate one of the $n$ storage elements of a given one of said $k$ storage registers being respectively connected to said first input lead of each of said $kn$ latch circuits in a separate one of said $n$ logic circuits.

14. An adaptive pattern recognition and prediction system according to claim 13 wherein each of said latch circuits in said adaptive means further includes first, second, and third channels and a first switching means, said first channel being coupled to said first input lead and said first switching means coupled between said second input lead and said second and third channels for connecting said second input lead to said second channel in said first mode of operation and for connecting said second input lead to said third channel in said second mode of operation.

15. An adaptive recognition and prediction system according to claim 13 wherein said output means includes,
  $n$ summing circuits, each one being coupled to the output channels of the $kn$ latch circuits in a separate one of said $n$ logic circuits,
  an $n+1$ summing circuit coupled to the $n$ storage elements in each of said $k$ storage registers, in said input storage means,
  $n$ threshold circuits, each one coupled to a separate one of said $n$ summing circuits and to said $n+1$ summing circuit, the threshold level of each of said $n$ threshold circuits being determined by the output signal from said $n+1$ summing circuit,
  a $k+1$ storage register having $n$ storage elements, each storage element thereof being coupled to the output of a separate one of said $n$ threshold circuits,
  second switching means interposed between said $n$ threshold circuits and said $k+1$ storage register for disconnecting said $k+1$ storage register from said $n$ threshold circuits in said first operating mode,
  means connecting the $n$ storage elements of said $k+1$ storage register to the $n$ storage elements of said given one of said $k$ storage registers, $n$ "EXCLUSIVE OR" circuits, each having two input channels and one output channel, one input channel of each "EXCLUSIVE OR" circuit being coupled to a separate one of said $n$ storage elements in said given one of said $k$ storage devices and the other input channel of each "EXCLUSIVE OR" circuit being coupled to a separate one of said $n$ storage elements of said $k+1$ storage register, an "AND" circuit coupled to the output channel of each of said $n$ "EXCLUSIVE OR" circuits, an $n+1$ "EXCLUSIVE OR" circuit having two input channels and one output channel with one of said input channels being coupled to the output of said "AND" circuit, and indicator means coupled to the output channel of said $n+1$ "EXCLUSIVE OR" circuit.

No references cited.

ROBERT C. BAILEY, *Primary Examiner.*

G. SHAW, *Assistant Examiner.*